(12) United States Patent
McNally (10) Patent No.: US 8,317,598 B2
(45) Date of Patent: Nov. 27, 2012

(54) HANDICAPPING AND DIFFERENTIAL REWARD SYSTEM FOR SKILL-BASED GAMES

(75) Inventor: Spencer Leonard McNally, Cape Town (ZA)

(73) Assignee: Spencer Leonard McNally, Cape Town (ZA)

( * ) Notice: Subject to any disclaimer, the term of this patent is extended or adjusted under 35 U.S.C. 154(b) by 518 days.

(21) Appl. No.: 11/380,452

(22) Filed: Apr. 27, 2006

(65) Prior Publication Data

US 2007/0265063 A1    Nov. 15, 2007

(51) Int. Cl.
*A63F 9/24*     (2006.01)
*A63F 13/00*    (2006.01)
*G06F 17/00*    (2006.01)
*G06F 19/00*    (2011.01)

(52) U.S. Cl. ................................. 463/23; 463/25; 463/7

(58) Field of Classification Search ....................... 463/23
See application file for complete search history.

(56) References Cited

U.S. PATENT DOCUMENTS

| | | | | |
|---|---|---|---|---|
| RE28,503 E | * | 8/1975 | Townsend et al. | 473/70 |
| 4,015,846 A | * | 4/1977 | Runte et al. | 463/3 |
| 5,265,888 A | * | 11/1993 | Yamamoto et al. | 463/10 |
| 5,779,549 A | * | 7/1998 | Walker et al. | 463/42 |
| 2001/0019965 A1 | * | 9/2001 | Ochi | 463/25 |
| 2001/0051835 A1 | * | 12/2001 | Cline | 700/91 |
| 2006/0030960 A1 | * | 2/2006 | Duhamel et al. | 700/92 |

OTHER PUBLICATIONS

Glickman, Mark E., "The Glicko System," Apr. 19, 2001, http://math.bu.edu/people/mg/glicko/glicko.doc/glicko.html.
Glickman, Mark E., "Example of the Glicko-2 System," Dec. 29, 2001, http://math.bu.edu/people/mg/glicko/glicko2.doc/example.html.
Giacobbi, Kevin "Biff", "Turn your gaming skills into cash at YouPlayGames.com," Jun. 23, 2003, GameZone, http://pc.gamezone.com/news/06_24_03_07_53AM.htm.
Microsoft Research, "The Details of the TrueSkill Ranking System," Dec. 17, 2005, http://research.microsoft.com/mlp/trueskill/Details.aspx.
Wikipedia, "ELO Rating System," Apr. 12, 2006, http://en.wikipedia.org/wiki/ELO_rating_system.

* cited by examiner

*Primary Examiner* — Michael Cuff
*Assistant Examiner* — Kevin Y Kim
(74) *Attorney, Agent, or Firm* — Banner & Witcoff, Ltd.

(57) ABSTRACT

Players in a multi-player electronic skill-based game receive differential rewards and penalties based on game play. When a player achieves a rewardable result (e.g., killing another player's game character), a reward quantum may be calculated based on a handicap associated with the player and a handicap associated with at least one other player.

23 Claims, 9 Drawing Sheets

| SKILL RATING | REQUIREMENTS |
|---|---|
| 0 | ENTRY LEVEL FOR ALL NEW PLAYERS |
| 1 | PLAYER ACHIEVES AT LEAST 5 KILLS WITH WEAPON A |
| 2 | PLAYER ACHIEVES AT LEAST 10 KILLS WITH WEAPON B |
| 3 | PLAYER ACHIEVES AT LEAST 5 KILLS WITH WEAPON A AND AT LEAST 10 KILLS WITH WEAPON B IN A SPECIFIED TIME PERIOD |
| etc | etc |

FIG. 10B

| SKILL RATING | REQUIREMENTS |
|---|---|
| 0 | ENTRY LEVEL FOR ALL NEW PLAYERS |
| 1 | PLAYER STRIKES AN OPPOSING CHARACTER IN THE ARM OR LEG AT LEAST 5 TIMES |
| 2 | PLAYER STRIKES AN OPPOSING CHARACTER IN THE TORSO AT LEAST 10 TIMES |
| 2 | PLAYER STRIKES AN OPPOSING CHARACTER IN THE HEAD AT LEAST 5 TIMES |
| etc | etc |

HANDICAPPING AND DIFFERENTIAL REWARD SYSTEM FOR SKILL-BASED GAMES

BACKGROUND

Computer and video games have been in existence since the second half of the 20$^{th}$ century. The first graphical computer game was created in 1952 by A. S. Douglas and was a version of Tic-Tac-Toe programmed on an EDSAC vacuum-tube computer which had a cathode ray tube display. The first video game was created about six years later in 1958 by William Higinbotham and was a simulated tennis game for two played on an ordinary laboratory oscilloscope. The first game intended for use on a computer was created by Steve Russell in 1962 and was called "Spacewar!"

The period leading up to the 1990's was dominated by single player games. However, with the rapid development of the internet outside of academic circles in the beginning of the 1990's and the introduction of the game DOOM (id Software, 1993), multiplayer games quickly gained widespread popularity. DOOM allowed for multiple PCs, each operated by a different player, to be connected in a network and, therefore, for each player to have a character present in a single, simulated game world.

The introduction of DOOM contributed greatly to the popularisation of a new genre of games called 3D-shooters or First Person Shooters (FPSs). A common characteristic of these games is that the player's perspective is that of a person holding a weapon of some sort and the play of the game generally involves the killing of enemies which, in the networked form of the game, normally includes other players.

FPS games are today played by hundreds of thousands of players simultaneously playing against each other in thousands of separate games played across thousands of game servers. For the majority of these games no further revenue accrues to the developers of the game once the game software has been sold to the users and to date the only business models that have successfully derived ongoing revenue from the games are sponsored tournaments, advertising-supported community web sites and dedicated game server hosting services. Subscription-based services are starting to achieve some measure of success, but to date this has been primarily in respect of games outside of the FPS genre.

A number of FPS game tournaments have been held in the past and are still being held from time to time. Two forms of these tournaments namely online and Local Area Network or LAN-based have been employed. Online tournaments are characterised in that players log onto the game server remotely and compete in the game environment against other remotely logged on players through the internet. LAN-based tournaments generally involve the setting up of a large number of game terminals over a Local Area Network (LAN) in a single location and connected to one or a number of game servers. Players then gather at the location to compete. Tournaments are normally structured into a number of rounds, sometimes with regional/conference-style qualifiers. The final rounds of the competitions are normally in a knock-out format in which the last surviving player will be the winner. In both of the above forms of the game it would be expected that less skilled players will be eliminated first and that only the more skilled players will proceed to further rounds. This may discourage less experienced and/or less skilful players from entering the tournaments as their chances of success are very remote if compared to the more experienced, more highly skilled players.

A small number of businesses currently operate tournaments, leagues, and ladders for online and offline game play. The majority of these do not involve any prize money. Where prize money is available, to date, in most cases the amounts are either relatively small or otherwise almost entirely funded by sponsors wishing to use the games as an advertising opportunity.

In the past, companies have tried to more meaningfully monetize the online multiplayer gaming market by launching play-for-money sites. Some of these businesses failed, in part, because there was no differentiation between stronger and weaker players and weaker players were hence discouraged to play the game as they were far more likely to lose money than make money, as indeed proved to be the case. Others failed because not enough players/teams chose to take up the challenges set by other players/teams, since weaker players/teams were almost certain to lose every time. While some players did choose to play against opponents of similar skill levels, the reduced liquidity that resulted from the skill-based segregation of the player base resulted in substantially less revenue generation for the business than might otherwise have been the case.

Apart from FPS games, a number of other websites exist for the playing of other skill-based games such as chess and backgammon for money. Most of these websites employ modified ELO (Árpád Élö) systems as employed for international chess ratings to give ratings to the participants of the games. The ratings are used mostly for the purpose of providing players with adequate knowledge of their skill level relative to their opponents in order that they can select opponents of similar skill levels. Certain such websites also restrict players from selecting opponents whose skill levels are substantially different from their own. Once again, skill-based segregation of the player base will lead to reduced revenue generation opportunities for such businesses and reduced playing opportunities for players.

The above is particularly true with regard to large-scale tournaments, where substantial numbers of players are required in order to build large prize pools. If the player base is always split into separate skill groups, then the possibility of massive tournaments is very substantially reduced. This is a substantial and obvious hindrance to the development of pay-for-play skill gaming as an industry.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

Embodiments may provide methods of enabling players of an electronic game played by two or more players having different skill levels to compete on a fair reward basis. Methods may include assigning a handicap to each player participating in the game, detecting when a player achieves a rewardable result, and determining the quantum of a reward associated with the rewardable result, to be credited to the player, as a function of at least the handicap associated with the player and the handicap associated with at least one other player participating in the game.

Additional embodiments may provide an electronic game system for an electronic game played by two or more players that enables players of different skill levels to compete on a fair reward basis. The electronic game system may include a game server that simulates a game environment, an input device associated with each player and connectable to the game server that enables the player to control a simulated player in the simulated game environment, a display associated with each input device for displaying the actions of the simulated player in the simulated game environment, a processor, and a memory coupled to the processor that stores machine instructions causing the processor to calculate the quantum of a reward to be credited to a player when the player achieves a rewardable result, wherein the quantum of the reward is calculated as a function of a handicap associated with the player to be rewarded and a handicap associated with at least one other player participating in the game.

Further embodiments may provide methods of calculating differential rewards in an electronic skill-based game played by two or more players having different skill levels. Methods may include assigning a handicap to each player participating in the game, detecting when a player achieves a rewardable result, and calculating the quantum of a reward associated with the rewardable result, to be credited to the player, as a function of at least the handicap associated with the player and the handicap associated with at least one other player participating in the game.

Additional embodiments may provide an electronic skill-based game with differential reward prizes. The electronic skill-based game may include a virtual electronic game environment hosted by a game server to which two or more players may connect in order to interact with one another in the game environment, a handicap calculator which assigns a handicap to each player and periodically updates the handicap, and a differential reward calculator which calculates the quantum of a reward to be credited to a player for achieving a rewardable result, wherein the differential reward calculator calculates the quantum of the reward as a function of the handicap associated with the player to be rewarded and the handicap associated with at least one other player participating in the game.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

Embodiments of the invention will now be described, by way of example only, with reference to the accompanying drawings in which.

DETAILED DESCRIPTION OF THE DRAWINGS

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

An embodiment of the invention will now be described with reference to an electronic gaming system and, more specifically, with reference to a gaming system for a First Person Shooter game played by numerous players, each playing on a personal computer, game console, etc. over a Local Area Network (LAN). Embodiments of the present invention are not limited to LAN-based networks and may be implemented in games played over larger distributed networks such as the Internet. Embodiments of the invention are applicable to games in which skill plays a greater role than luck, but are nonetheless applicable to all games in which skill plays even a small part. The invention is also not limited in its application to electronic computer network games, but may equally be applied in multiple player arcade games and in other gaming systems for determining the quantum of rewards obtained by players of the game. Embodiments of the invention may be applied to multiple player games played over mobile telephone networks or other portable or handheld devices, in which case each player may play the game on a mobile telephone or other portable device interacting with one or more game servers and/or other mobile telephones/portable handsets over a mobile telephone or other network.

Figure 1:
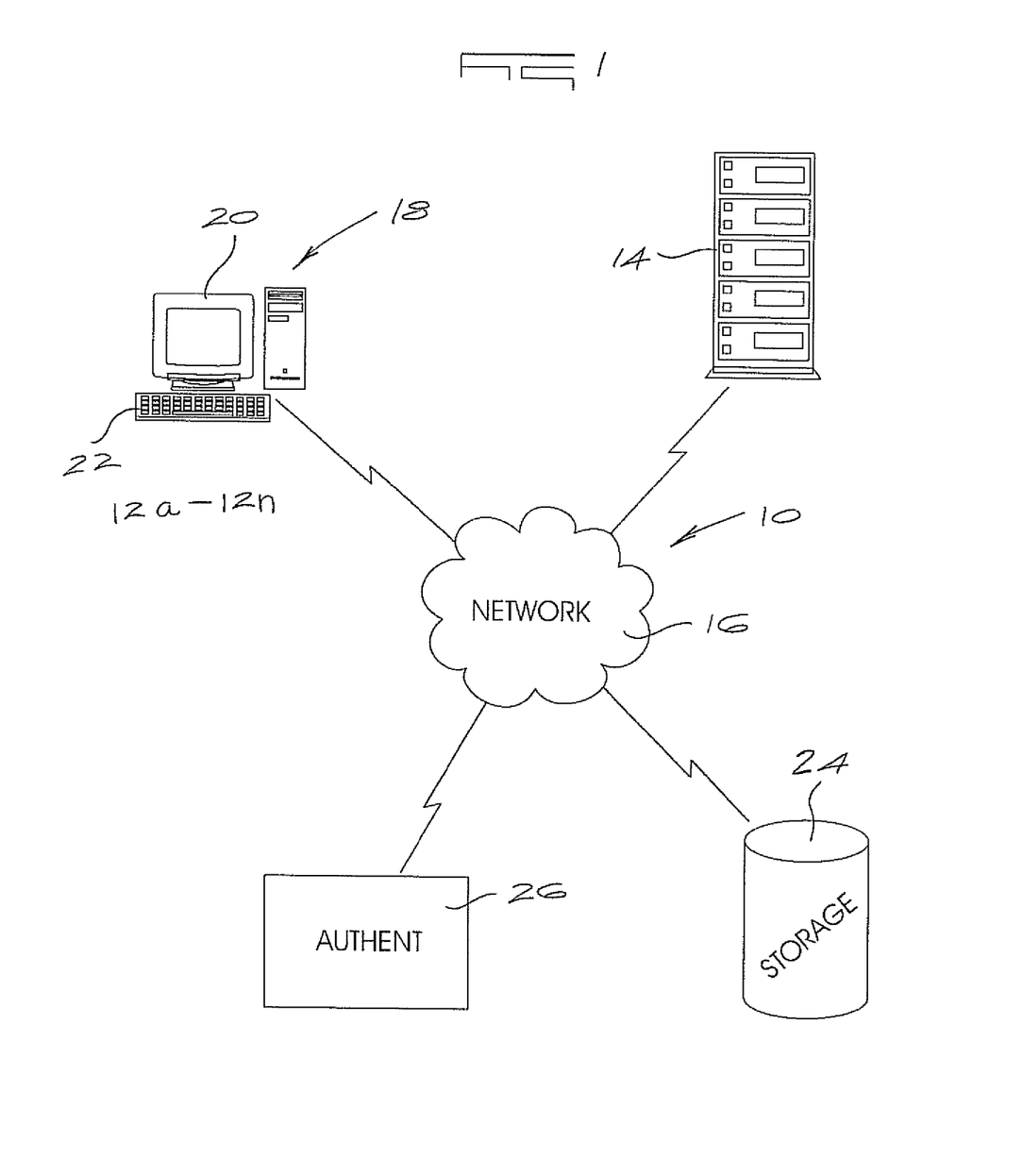
FIG. 1 illustrates a network gaming system.

In FIG. 1, reference numeral 10 generally indicates a network gaming system enabling players having different skill levels to compete on a fair reward basis.

The system 10 includes a plurality of gaming units 12*a* . . . 12*n* and a game server 14 interconnected via a network 16. The server 14 includes a processor (not shown) and a memory (not shown) on which is stored machine instructions which allows the server to host an electronic FPS game which can be played by a plurality of players, each utilizing one of the gaming units 12. Each of the gaming units 12 comprises an independent personal computer 18 having its own processor (not shown), display means 20, which in the present embodiment is a computer monitor, and an input device such as a keyboard 22 and/or computer mouse (not shown). The network 16 may be implemented using any one or more of a variety of communication configurations including both wired and wireless types. Communication of data via the network between the gaming units 12 and server 14 may be done using a variety of communication protocols including both public and proprietary protocols.

The system 10 further includes a data storage facility 24 and a player authentication module 26. The storage facility 24 is used to store a record associated with each player which record may contain both personal information about the player such as its name, identity number, residential address and the like, as well as game-related information such as an indication of the player's skill level, which in the present embodiment is the player's handicap, and the net value of the players credit balance. The authentication module 26 is used to authenticate a player to the server 14 before the player will be allowed to participate in a gaming session of the game hosted by the server 14.

The game server 14 simulates a gaming environment within which players can manipulate simulated characters to compete against each other. In the case of most FPS games the gaming environment consists of a fixed virtual three-dimensional game world with a pre-defined layout and appearance. In some games the layout and appearance may, however, change dynamically as the game progresses. Each player may be situated at its own gaming unit 12 and has full control over a simulated character in the simulated game world. Each player may interact directly with the environment through the simulated character it manipulates. All players normally may have the same perception of the game world and may be bound by the same rules and game physics as dictated by the game world, but the on-screen view displayed on the monitor associated with each player at any given time, may be that of the simulated character the player controls. Each player may also see the simulated characters of the other players in the game world on his monitor when those other characters are in the field of vision of his own character in the game world. A player may then attempt to kill the characters of other players by, for example, shooting at them, throwing objects at them, detonating bombs, or in any number of additional ways as allowed for by the specific game.

The game may be played in a variety of formats, some of which are illustrated as follows:

One-against-one—two individual players may compete against each other in the game world to the exclusion of all other players;

Many-against-many—players may be divided into teams which compete against each other; and Everyone-for-themselves—each player may compete against all other players present in the game world at any given time.

The server 14 may keep the simulated game world in perpetual existence and may allow players to enter and exit the game world at will. The logic shown in FIG. 2 may be used to regulate the entrance and exit of a player into and from the game world as well as the game play itself.

Figure 2:
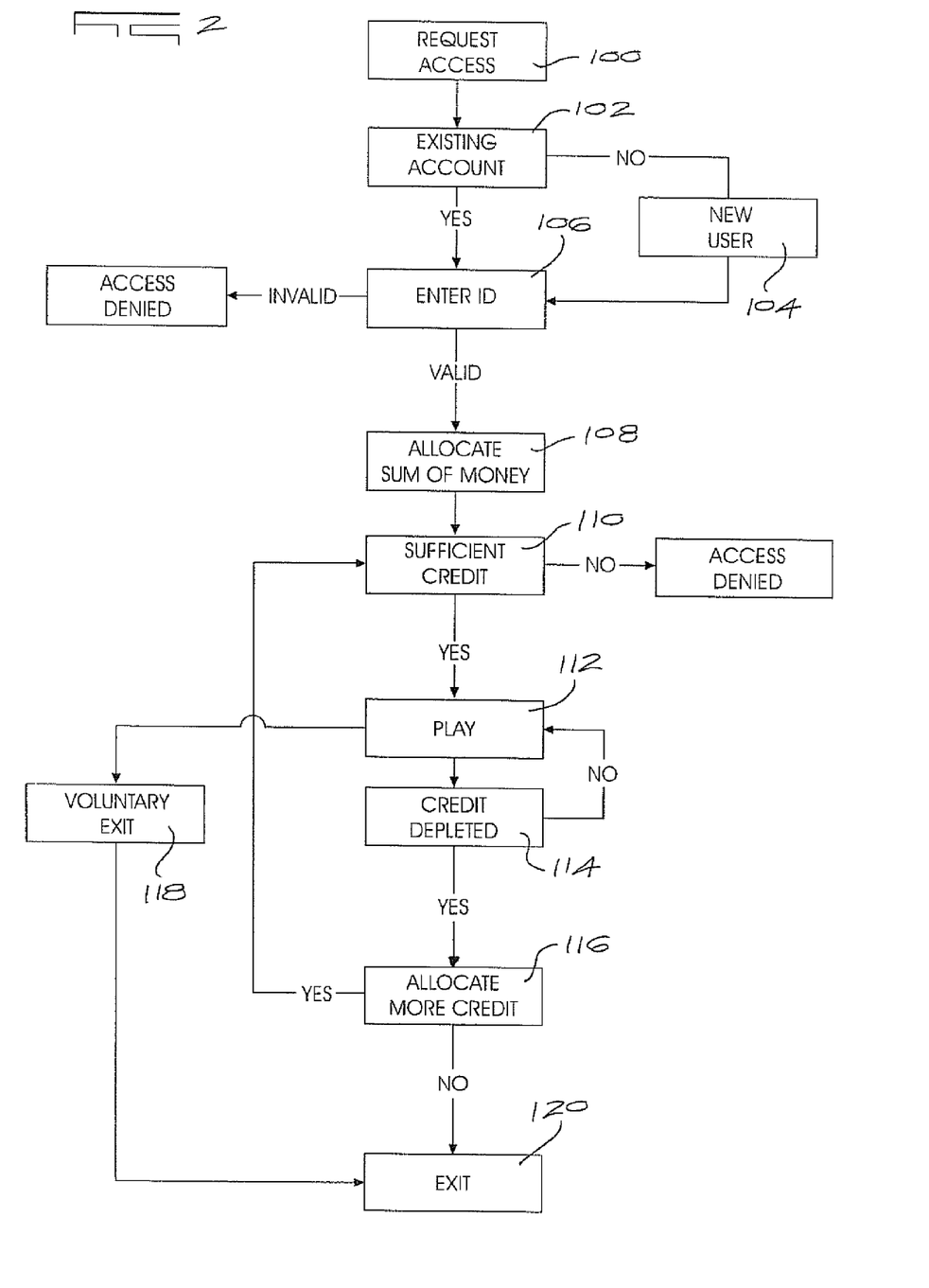
FIG. 2 is a flow diagram of logic used to regulate entry and exit of players into and from the game world as well as game play in a network gaming system.

At a stage 100, a request may be made to the server 14 to allow the player access to the game world from a game unit 12 via the network 16, upon which request the server may request the player at stage 102 to indicate whether it holds an existing player account or whether it is a new player. If the player indicates that it is a new player, the server 14 may initiate a sequence of events at stage 104 during which the player sets up a new player account. During this sequence of events the player may be requested to enter certain identification information including, for example, its name and surname, alias or username, a player selected password and such other information as may be necessary to authenticate the player. The creation of a new player account can be conveniently dealt with by the authentication module 26. Once the player has supplied the requisite information a unique player record may be created and stored on the data storage facility 24. The new record may contain all the identification information as provided by the player. The record may also include a player credit balance which gives an indication of the credit available to the player and which may be set to zero on creation of the new player account, and a handicap which may be selected as the median of the distribution of the handicaps of all the players holding active player accounts on the system. The handicap, however, may be selected as any other appropriate value, for example, the $40^{th}$ percentile, which will make the gaming experience more rewarding for new players.

After creation of a new player account, or if the player indicates that it holds an existing player account, the player may be requested to enter its unique username or alias at stage 106 and a password. The player authentication module 26 may then authenticate the identity of the player. If authentication is unsuccessful, the player may be refused access to the game world. On successful authentication of a player, the player's player account may be retrieved from the data storage facility 24 by the server 14 and the player may be requested at stage 108 to indicate what portion of its credit balance it is prepared to risk during the course of the particular game session. The player credit balance may be indicated as an actual amount of money or as a number of game points which is indicative of an actual amount of money. Once the player has indicated the portion it is prepared to risk, the player's credit balance may be checked at stage 110 to see whether the player has sufficient credit to risk such an amount. If the player's credit balance is insufficient, the player may be repeatedly requested to enter a lesser amount and may be refused access to the game world until such time as an appropriate available amount has been specified. A player may at any time supplement its player credit balance by buying more credit. The process of buying credit may be done in a variety of ways, for example, by making an electronic transfer from a bank account held by the user at a recognised financial institution into an account associated with the game server 14 or by allowing for online secure credit card payments. If the player credit balance is sufficient, the amount specified by the player may be reserved by the server 14 on the player's credit balance and the player may be allowed access to the game world at stage 112. During game play, the player's credit balance may not be allowed to reduce by more than the specified amount.

Once a player has been granted access to the game world, the player may attempt to kill opposition characters, manipulated by other players, in the game world by shooting them or by such other means as are possible in accordance with the rules and physics of the game, all the while attempting to avoid its own character being killed. Depending on the format of the game, the opposition may be a single other player, all players on an opposing team or all other players present in the game world at the time. Each time a player kills another player's character, an amount of credit changes hands between the players. The amount of credit changing hands may be determined by the handicapping and differential reward system as is explained below and also depends on the format of the game being played. For example, in the one-against-one format credit may change hands between the two competing players, in the many-against-many format credit may change hands between accounts associated with two competing teams and/or their constituent players, and in the everyone-for-themselves format credit may change hands between the two players involved in the incident leading to a rewardable result or potentially between the two players and a number of other players involved in the game at the same time.

In the case of the one-against-one and everyone-for-themselves formats of the game, for example, the changing of hands of credit may be effected by crediting the credit balance of the player making the kill, and at the same time debiting the credit balance of the player whose character was killed. In the many-against-many format of the game, for example, the changing of hands of credit may be effected by crediting the account of the team to which the player who made the kill belongs and by debiting the account of the team to which the player whose character was killed belongs. In addition, the accounts of the individual players involved may in certain circumstances also be credited and debited, as the case may be.

During a gaming session, the server 14 may constantly keep track of a player's credit balance at stage 114. Once the amount a player is willing to risk, as specified, for example, by the player at the commencement of the gaming session, is reached, the player may be temporarily removed from the game world and given an option to allocate an additional amount of credit to risk during continuance of the game at stage 116. If the player exercises the option it may be requested to specify such further amount and is returned to stage 110 as described above. If the player elects not to exercise the option, it may proceed to stage 120 at which stage it may permanently exit the game world.

A player may also at any stage voluntarily exit the game world. This may be done, as shown at stage 118, by the player advising the server 14 that it wishes to do so, at which stage the player proceeds directly to stage 120 and permanently exits the game world.

In FPS games the different players participating in the game at any given time normally have different skill levels. In a game system with the game play and revenue model as described above it will therefore be expected that stronger players may kill more opponents than weaker players and also that weaker players may be killed more often than stronger players. If the game is played as described above and the credit translates into actual money, it may therefore be expected that weaker players may continue to lose money to stronger players while stronger players continually take money from weaker players. This may discourage weaker players from competing against stronger players or even from entering game worlds in which potentially stronger players are playing. This in turn implies less revenue for the operators of the game servers and reduced playing opportunities on a for-money basis for players.

In order to alleviate these problems, embodiments of the invention may provide a handicapping and differential reward system whereby weaker players are rewarded with greater amounts for killing stronger players and stronger players are rewarded with lesser amounts for killing weaker players, in order that the overall financial expectations of all players be equalised. In order to gauge a player's skill level, a handicap may be assigned to each player and such handicap may be updated continually as the player participates in the game.

To incorporate this functionality, the memory associated with the server 14 may also contain machine instructions causing the server to record player activity during a game session. In particular, the server may record the number of times rewardable or penalisable results are achieved by a player. As mentioned above, a rewardable result may correspond to the player killing an opponent's character in the game world, and a penalisable result may correspond to the player's character being killed by an opponent.

As mentioned above, a handicap may be assigned to a player at the time of creation of a player record. Every time a player subsequently enters the game world, the player's player record may be accessed and its handicap retrieved. The player's handicap may then be updated each time the player achieves a rewardable or penalisable result. The handicap may be updated in real-time immediately upon the occurrence of the result so as to ensure that the player's handicap remains as accurate as possible. When the player exits the game world, its latest handicap may again be stored in the player record on the storage facility 24. It will, however, be appreciated that a player's handicap may remain the same during a single game session and may only be updated once the player ends a particular game session by exiting the game world.

Figure 3:
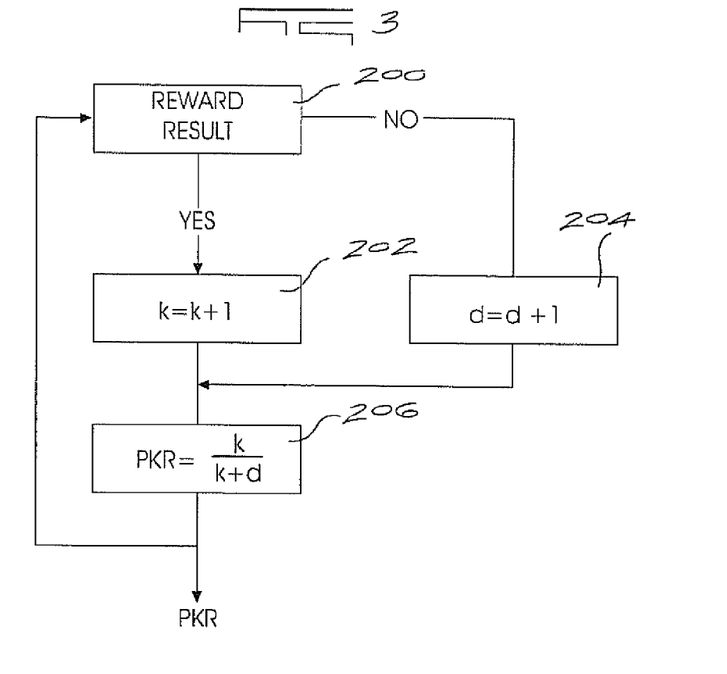
FIG. 3 is a flow diagram of logic used to determine a player's handicap in a network gaming system.

The logic shown in FIG. 3 is shown as an example system that may be used to update a player's handicap each time the player achieves a rewardable or penalisable result. It will be appreciated that any number of systems may be used to calculate and adjust a player's handicap.

In this example, a player's handicap is expressed as its player kill ratio (PKR) which is calculated with the following formula:

$$PKR = \frac{k}{(k+d)}$$

In the formula k represents the number of times a player kills an opponent's character and d represents the number of times a player's character is killed.

At a stage 200, the server identifies when a player achieves a result that can be either rewardable or penalisable. If the result is rewardable, k is incremented at stage 202. If, on the other hand, the result is penalisable, d is incremented at stage 204. The new PKR of the player is then calculated at stage 206 according to the above formula.

The PKR of a player is therefore a rational number between 0 and 1 and is indicative of the player's skill level. A PKR close to 0 therefore indicates a handicap associated with a weak player and a PKR close to 1 indicates a handicap associated with a strong player. PKR values may be grouped into bands of, for example, 5% at a time, in which case the player's handicap may be an integer value between 0 and 20.

It is important to note that, since a rewardable result may involve at least two players, the one being the killer and the other the killee, each rewardable result obtained by a first player may have a corresponding penalisable result for a second player. Each adjustment of a handicap for a first player therefore also entails the adjustment of the handicap of a second player.

As explained above, each time a rewardable or penalisable result occurs during a game session, credit may change hands between the players involved in the activity that caused the result. The determination of the quantum of the credit to change hands is now explained for the one-against-one and everyone-for-themselves formats of the game.

As mentioned above, weaker players may be rewarded with greater amounts for killing stronger players in order to maintain their interest in the game and to give them an opportunity to compete on a fair reward basis with stronger players. The quantum of the reward to change hands between the players on the occurrence of a rewardable result may be calculated as a function of the handicaps associated with both players involved in the event leading to the result.

Figure 4:
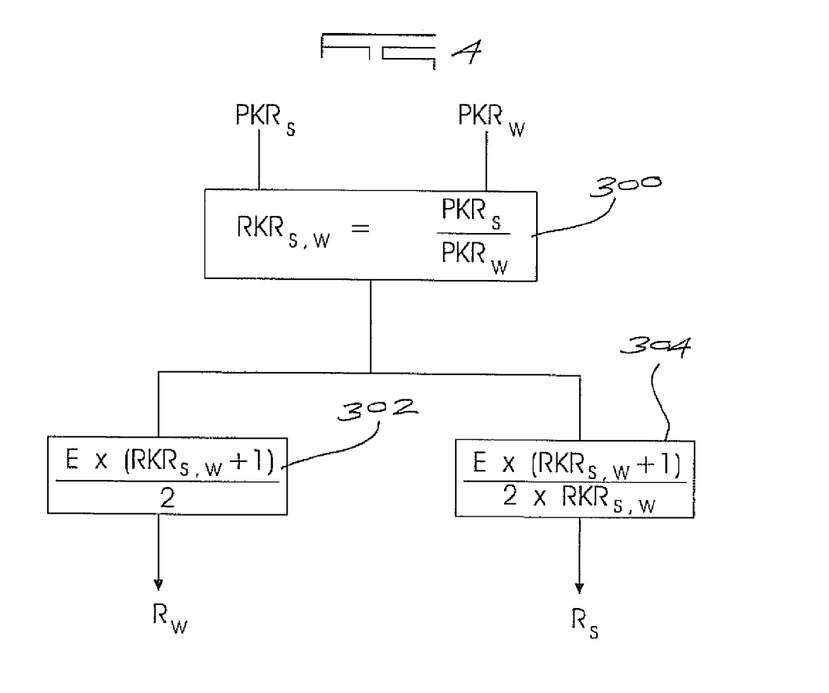
FIG. 4 is a flow diagram of logic used to determine a quantum of a reward to be awarded to a player who achieves a rewardable result in a game played on a network gaming system.

The logic shown in FIG. 4 is an example of a system that can be used to calculate the quantum of the reward to be credited to the player credit balance of the player who achieved the rewardable result and the quantum of the penalty to be debited to the player credit balance of the player who achieved the corresponding penalisable result. For the purpose of the explanation it may be assumed that a rewardable event occurs between two players of different handicaps or, in the present example, PKRs. At a stage 300, the relative kill ratio (RKR) of the players is determined. The RKR may give an indication of the skill level of the stronger player involved in the event leading to the rewardable result, relative to the skill level of the weaker player involved in the event leading to the rewardable result. For example, for the purpose of determining the RKR, let $PKR_s$ be the player kill ratio of the stronger player and let $PKR_w$ be the player kill ratio of the weaker player. The relative kill ratio between the stronger and the weaker players $RKR_{s,w}$ is then calculated at stage 300 according to the following equation:

$$RKR_{s,w} = \frac{PKR_s}{PKR_w}$$

From the equation, if a rewardable result occurs between players of similar skill levels, in this description PKRs, the relative kill ratio of the two players will be 1.

For the purpose of this description, let the value of a reward obtained by a first player for killing a player with an equal handicap in the game be E. E therefore represents a base unit of a reward obtainable for achieving a rewardable result and may vary from game to game. If, however, the players have different handicaps, the fair amount of credit to change hands may be more or less than E depending on whether the stronger or weaker player killed the other player. If the weaker of the two players involved in the event kills the stronger player, the fair quantum of the reward changing hands between the players ($R_w$) may be calculated at stage 302 according to the following equation:

$$R_w = \frac{E \times (RKR_{s,w} + 1)}{2}$$

Conversely, if the stronger of the two players involved in the event kills the weaker player, the fair quantum of the reward changing hands between the players ($R_s$) may be calculated at stage 304 according to the following equation:

$$R_s = \frac{E \times (RKR_{s,w} + 1)}{2 \times RKR_{s,w}}$$

It is possible to define a single formula for calculating $R_s$ and $R_w$. Separate formulae are shown above for the sake of clarity.

To illustrate the operation of the equations, suppose that $PKR_s$ is 0.9, $PKR_w$ is 0.1 and E is $1.00. The $RKR_{s,w}$ is therefore 9. If the weaker player now kills the stronger player, an amount of $5.00 may change hands from the credit balance of the stronger player to the credit balance of the weaker player. If, on the other hand, the stronger player kills the weaker player, an amount of $0.56 may change hands from the credit balance of the weaker player to the credit balance of the stronger player. This implies that if the handicap of a stronger player is nine times better than that of a weaker player, the weaker player may get a reward for killing the stronger player which is nine times more than a reward the stronger player will get for killing the weaker player.

The amount of credit debited to the player credit balance of the player being penalised may not be equal to the amount being credited to the player credit balance of the player being rewarded as a result of the same rewardable result. The reason for this discrepancy is that the server 14 may take a portion of the reward as a service charge. The full quantum of the amount to change hands may thus be debited to the player credit balance of the player being penalised, but a lesser amount may be credited to the player credit balance of the player being rewarded. The difference in the amounts may be the amount taken as a service charge by the server 14. In this way, the operators of the game server 14 may ensure a perpetual income from the maintenance of the game environment.

The situation may arise where a player's credit balance is lower than the maximum amount that he can potentially lose in a single event. This may, for example, be the case where a player with a PKR of 0.95 and a credit balance of less than $10.50 plays in a game where E=1 and where he could potentially be killed by a player with a PKR of 0.05. If the player with the 0.05 PKR were to kill the player with the 0.95 PKR, the amount of credit in the stronger player's credit balance may not be sufficient to pay the weaker player the amount due to it.

In such a situation the server 14 may intervene to ensure equity. This may be done by the system scaling down the reward obtainable by a stronger player with a potentially inadequate balance, with reference to the amount it would have lost if it were to be killed by a weaker player. The scaling down of the quantum of a stronger player's reward for killing a weaker player may therefore only be done if its credit balance ($B_s$) is less than the amount that would have been awarded to the weaker player, had the weaker player in fact killed the stronger player. Let the reward obtained (or obtainable) by a weaker player for killing a stronger player be $R_w$.

Figure 5:
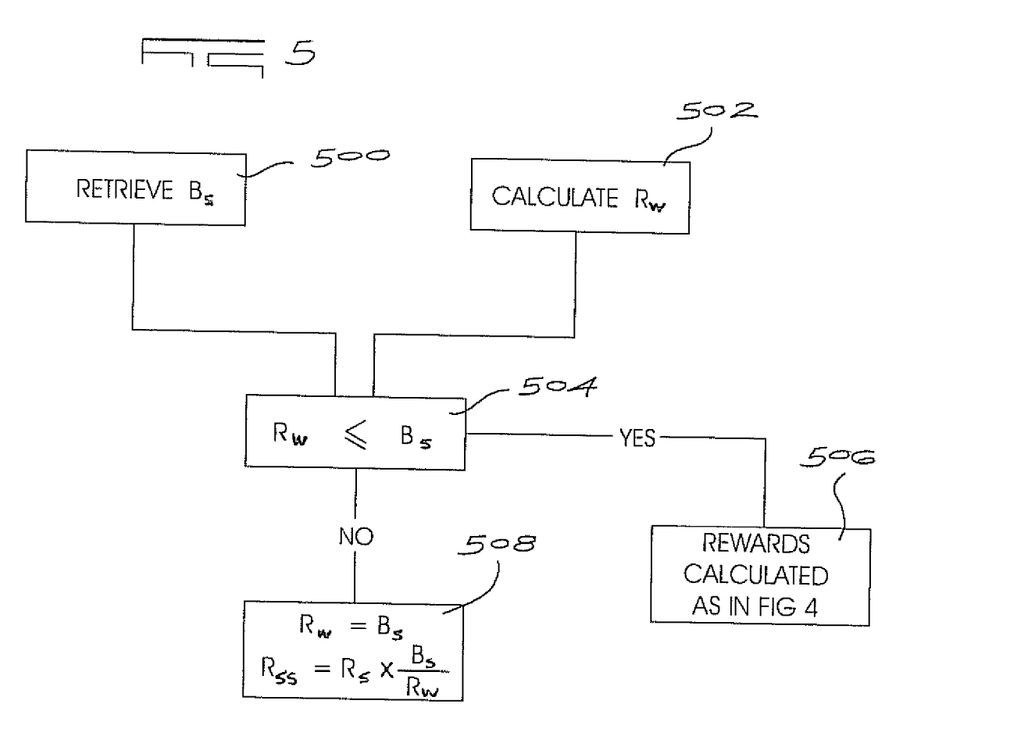
FIG. 5 is a flow diagram of the logic used to determine an amount of credit to be transferred between players in the situation where one of the players has insufficient credit.

The logic shown in FIG. 5 may be used to determine the rewards obtained by both the stronger and weaker players in such a situation. At a stage 500, the credit balance of the stronger player ($B_s$) is retrieved and at a further stage 502 the reward obtained or obtainable by the weaker player involved in the event causing the rewardable result ($R_w$) is calculated as explained with reference to FIG. 4 above. This may be done each time a rewardable result occurs. At a stage 504, $B_s$ and $R_w$ may be compared. If $R_w$ is less than or equal to $B_s$, then the rewards may be awarded as explained in FIG. 4 above at stage 506. If, however, $R_w$ is greater than $B_s$, the rewards to be obtained by either the stronger or the weaker player may be calculated at a stage 508 according to the following formulae:

1. $R_w = B_s$; or

2. $R_{ss} = R_s \times \dfrac{B_s}{R_w}$

In these equations, $R_{ss}$ represents the scaled down reward awarded to the stronger player and $R_s$ represents the unscaled reward as calculated with reference to FIG. 4 above.

To illustrate the operation of these equations, suppose that the relative kill ratio ($RKR_{s,w}$) between a stronger player (S) and a weaker player (w) is 20 and S has a player credit balance ($B_s$) of $5.25 in its player credit balance in a game where the Equal handicap base value (E) is $1.00. The quantum of the reward payable to W for killing S ($R_w$), calculated according to the formula as explained with reference to FIG. 4 above, is therefore $10.50. $R_w$ is therefore greater than $B_s$ which implies that, should S be killed by W, S's player credit balance will be insufficient to reward W in full. According to the reasoning employed to ensure equity, it will therefore not be equitable in the circumstances to reward S in full for killing W. Now, according to the formulae shown above, if W kills S, it will be rewarded the full balance of S's player credit balance, $B_s$. If, however, S kills W, the reward transferred to it will be scaled down according to formula 2 directly above to compensate for its insufficient credit balance ($B_s$). Accordingly, in the circumstances, S will only be awarded $0.26 for killing W.

Figure 6:
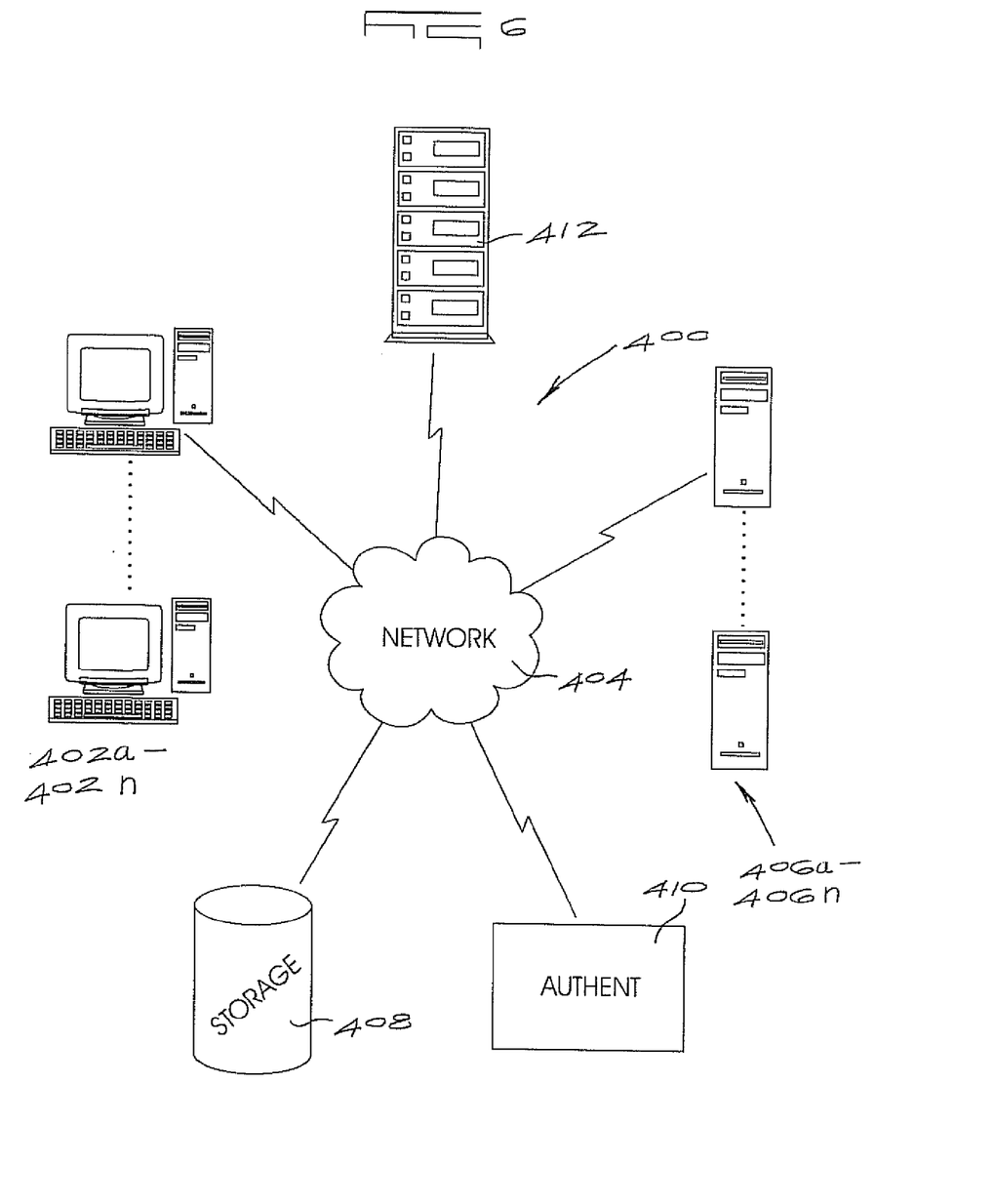
FIG. 6 illustrates an alternative embodiment of a network gaming system.

FIG. 6 illustrates a network gaming system 400 in accordance with an embodiment of the invention. The gaming system 400 may again be configured to support a game played by numerous players, each playing on a gaming unit 402a . . . 402n, which may again be personal computers, over a network 404. However, the network 404 is not necessarily a LAN, but represents any of a wide variety of data communications networks which may include public portions, for example the Internet, as well as private portions such as LANs.

In addition to the storage facility 408 and the player authentication module 410, the system 400 now includes a number of game servers 406a . . . 406n. Each of the servers may be capable of hosting a game independent from the other servers, but may also be capable of communicating with the other servers though the network 404. A player wishing to play a game may request access to a game hosted by any of the servers 406a . . . 406n, or, alternatively, may be allocated to a specific server by the system. The system 400 may also have a primary server 412 which coordinates communication between the various servers or which deals with the updating and manipulations of player records of players playing on all the servers 406.

The system 400 may be well suited for conducting large online gaming tournaments. During such a tournament, players from a large number of gaming units 402a . . . 402n may enter the tournament remotely and pay an entry fee which goes into a prize pool. To enable all the players to compete while avoiding overloading any particular server 406, the players may be distributed amongst the various servers 406a . . . 406n each of which hosts an independent game. The primary server 412 may keep track of the credit balances of all the players participating on all the servers and may handle the entering and removal of players into and from the servers 406. As some of the player's credit balances are depleted, they may fall out of the tournament until eventually the last remaining player or the player with the highest credit balance at the end of a predetermined period of time is declared the winner and wins the money in the prize pool. The handicapping and differential reward system as explained above may be incorporated during the tournament to manipulate the increases and reductions of the player's credit balances as they achieve rewardable and penalisable results during the tournament.

The gaming units do not have to be stand-alone personal computers with their own processors and memories. If the server is equipped with sufficient processing power and input connectors, it may be possible for each gaming unit to be comprised of a display and input means. The display and input means associated with each player may then be connected directly to the game server thus alleviating the need for a network. The gaming units also do not have to be personal computers or conventional personal computer monitors and keyboard-and-mouse combinations. The gaming units may be, for example, arcade games, game consoles, cellular or mobile telephones, hand-held devices that execute games and the like.

The acquisition of credit in a credit balance of a player, other than by rewards obtained through the differential reward system during game play, may be an area which leaves room for many variations. As described above, a player may purchase credit which will allow it to participate in a game. This credit, as explained, can be purchased by transferring money from a bank account at a recognised banking institution into a bank account of the game server's operator or by an online credit card purchase. In the embodiments described above, it may, however, be assumed that a player's credit balance will always be positive. A player's credit balance may, however, be allowed to go into overdraft. If this is allowed, the game server may invoice the player periodically for amounts owing on the player's credit balance. Alternatively, the player may arrange for a debit order to be instituted against a bank account held by the player at a recognised banking institution towards payment of the overdraft in the player's credit balance. The amount or a percentage of the amount owing by the player may thereby automatically be deducted from the player's bank account on a regular basis and credited to the operator of the game server. The player account may therefore also include details of a player's bank accounts and preferred method of payment.

Credit may not actually change hands between players when a rewardable result is achieved. This may be achieved by rewarding players for achieving rewardable results from a pot of credit maintained by the game server. Players may pay credit into a common game pot when entering the game world and may not be penalised directly when their characters are killed in the game world. The amount of the reward associated with the rewardable result may, however, still be calculated as a function of the handicap of the player being rewarded and the handicap of at least one other player. This form of reward payment may be particularly relevant in gaming tournaments as described above. In tournaments, the players may not play for actual money or even credits which may be translated into a monetary amount. Credit in tournaments may merely represent points scored, vouchers for entry into subsequent games or vouchers for entry into subsequent game tournaments. These additional forms of credit may also be used in the non-tournament forms of games.

Where games are played for money or credit which is representative of money, it should be appreciated that payments of amounts due to players may be made to the players automatically after the player exits the game world, while a gaming session is in progress or even periodically at later stages or at a request for payment by the player. Again, the description does not attempt to provide an exhaustive list of payment possibilities but merely aims to indicate that numerous methods of payment are possible.

Additional game formats are the many-against-many or teams variants. Here, players are divided into teams and the members of teams may attempt to kill members of other teams and (in some games) achieve other or additional game-specific objectives such as rescuing hostages, detonating or defusing bombs or capturing flags. Each player in a team will still have its own handicap which may be calculated as described above and further below. In addition, each team may also have a team handicap which may be calculated as the aggregate or some other combination of the handicaps of the members of the team.

In team variants, when a member of a team achieves a game objective, the player who achieved the objective and/or the team to which he belongs, may receive a reward. Accordingly, if a penalisable result ensues for a second player and/or the opposing team as a result of the achievement of a game objective by a first player, the second player and/or the team to which it belongs may be penalised. The quantum of the reward or penalty so obtained may still be calculated as described in the differential reward system above, but instead of using the handicaps of the players involved for the calculation, the team handicaps of the various teams involved may also be used. Some combination of the handicaps of the players and that of the teams involved may also be used. The reward and/or penalty should be calculated so as to reflect fairness based on the players' and teams' respective skill levels.

Even if a team format of a game is not played, the handicaps of other players participating in the game, in addition to the players actually involved in causing a rewardable or penalisable event, may be used to calculate the quantum of a reward or penalty.

A player or teams' handicap may not be updated in real-time immediately upon the happening of a rewardable or penalisable event. The server may keep a record of all rewardable and penalisable events achieved by all players and/or teams participating in a gaming session and may update the player or team's handicap only upon the player or team exiting the gaming world after a particular session. This may allow a player or team to play with the same handicap throughout a particular gaming session. Player or team handicaps may also be updated periodically on the basis of data stored by the server over a period of time.

As described above, a player may have to kill an opponent in order to achieve a rewardable result. Accordingly, a penalisable result occurs if a player is killed. A player may also be rewarded for inflicting injury to an opponent without killing it. The calculation of the quantum of the reward or penalty, as the case may be, for inflicting non-lethal injury to an opposition player may be calculated as described in the differential reward system above. The calculation may, however, incorporate an appropriate scaling factor to reflect the severity of the injury so caused. In certain FPS games it is also possible for a player to kill its own character in the game world. This is commonly referred to as player suicide. It may be possible for the system to recognise a suicide as a penalisable result and the player may be penalised accordingly.

In some versions of FPS games, the game server 14 may introduce additional characters in the game world that are not controlled by other players, but rather by the server itself. These additional characters are know as bots among players of FPS games and can function in exactly the same way as all human-controlled characters. Bots are capable of killing human-controlled players and vice versa. The handicapping and differential reward system of the current invention may also be applied in FPS games that include bots. In these cases, the bots will also be assigned handicaps, possibly based on their skill level. If a player kills a bot, its own handicap and that of the bot may accordingly be used to determine the reward payable to the player. Accordingly, if a player is killed by a bot, both the handicap of the bot and that of the player may again be used to determine the quantum of the penalty the player will pay.

In the embodiments described above, a player's handicap is represented by the player's player kill ratio (PKR). It is, however, possible to employ other indicators to represent a player's handicap. A modified ELO (Árpád Élö) system may, for example, be used to get an indication of a player's skill rating compared to other players participating in the game. For example, the handicap should give some indication of the skill level of the player and the handicaps associated with both the player making the kill and the player being killed should be used to determine the quantum of the reward. The actual computation of the handicap and the differential reward payable to the players could be done in numerous ways and using a wide variety of parameters. By way of example, a number of alternative ways of calculating player handicaps and differential rewards will now be explained with reference to FIGS. 7 to 10.

As explained above, player kill ratios (PKRs) may be grouped into bands of, for example, 5% at a time. This has the effect of dividing all players into one of 21 distinct skill ratings. The skill rating associated with each player may, in turn, be used as the player's handicap. The logic shown in FIG. 7 may be used to determine a player's handicap as a player skill rating (PSR). At a stage 600, a player's player kill ratio (PKR) is determined with the formula as described above with reference to FIG. 3. As described, the PKR will be a rational number between 0 and 1. At a stage 602, the PKR of the player may then be multiplied by the number of distinct skill ratings (N) required. The result obtained at stage 602 is therefore a rational number between 0 and N. At a stage 604, the integer of the value obtained at stage 602 may be taken that results in a whole number ranging between 0 and N and is the player's PSR. The PSR of a player may then be used to indicate a player's handicap.

The player kill ratio (PKR) and player skill ratio (PSR) systems as described above with reference to FIGS. 3 and 7 may also be implemented using only a limited set of prior event data. This may be done by, for example, placing a limit on the number of kills (k) and deaths (d) recorded between any two players. If, for example, the limit is set to the five most recent events, then no matter how many times player A kills player B, only the five most recent events between the players may be used during handicap calculation. A similar result may be achieved by limiting the data used during calculation of a player handicap with respect to time. This can, for example, be done by only counting the number of kills (k) and deaths (d) recorded by a player in the last 2 days. Either method ensures that handicaps react dynamically to changes in player performance over time. By placing the above limitations on the data used to determine handicaps, the system may also guard against the situation where two players collaborate in an attempt to defraud other players in the game system. If, for example, player A agrees with player B that it will allow player B to kill it a number of times in order to lower its handicap so that it may compete against other players in the game world with an unrealistically low handicap and thereby achieve higher rewards, placing a limit on the number of past events between two players used in calculation of a player handicap, will prevent player B from influencing player A's handicap by more than a certain amount.

Figure 8:
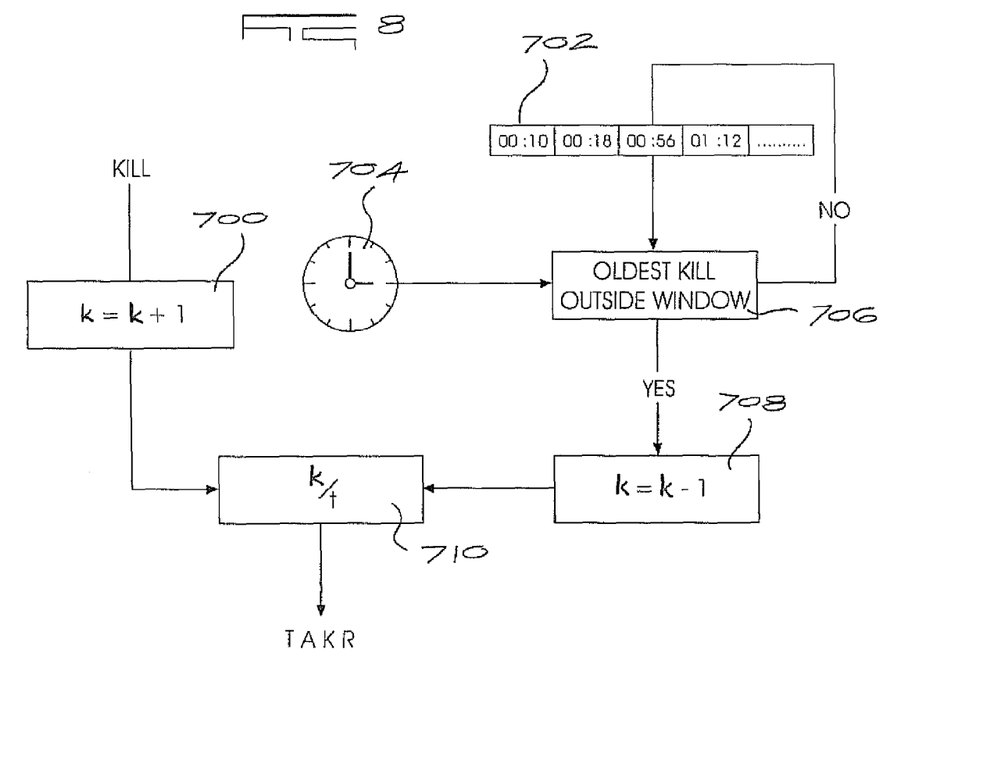
FIG. 8 is a flow diagram of further alternative logic used to determine a player's handicap in a network gaming system.

The logic shown in FIG. 8 may be used to determine a player's time-adjusted kill ranking (TAKR). This may be done by only keeping track of the kills made by a player during a fixed time window, for example, the last two hours, and using only the number of kills made by the player in that time window to determine its handicap. All the players in the game universe are ranked by reference to the number of kills they made within the time window and each player's relative ranking is used as an indication of its handicap. At a stage 700, a variable k, which represents the number of kills a player has made within a specified time period, is incremented each time a player kills the character of another player. Each time a player makes a kill, the specific time at which that kill was made is recorded and stored in a kill-array 702. Memory in server 14 stores machine instructions which cause the processor to constantly monitor the oldest kill (which corresponds to the kill that was made the longest time ago) and to compare the time at which the oldest kill was made to the current time which it receives from a clock 704, at stage 706. If the difference between the current time and the time at which the oldest kill was made is larger than the time window, then k is decremented at a stage 708. The formula used to constantly determine a player's handicap at a stage 710, is as follows:

$$TAKR = \frac{k}{t}$$

In the formula, t represents the size of the time window, for example, an integer number of hours, and, as mentioned above, k may represent the number of kills made by a player within the time window.

Once all such calculations have been done for all players, the total universe of players may be ranked in decreasing order and thereafter segregated into bands of (for example) 5% in order to determine a rating for each player that is relative to all other players.

Figure 9:
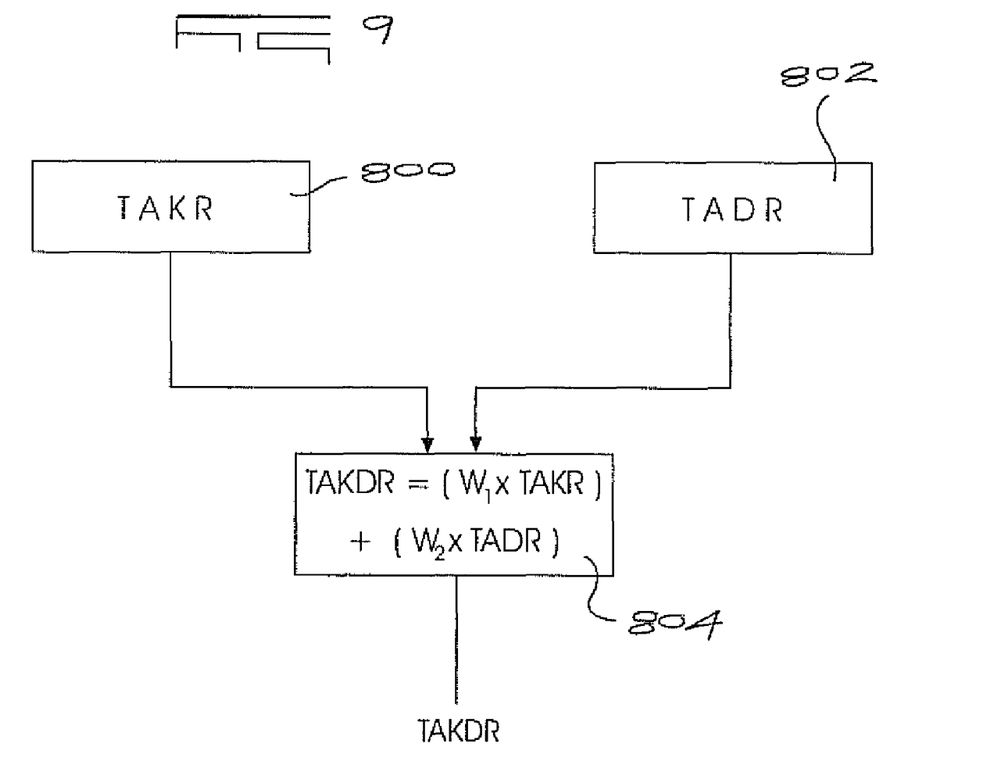
FIG. 9 is a flow diagram of still further alternative logic used to determine a player's handicap in a network gaming system.

The logic shown in FIG. 9 is used to determine a player's time-adjusted kill and death ranking (TAKDR) which may be used as a player's handicap. At a stage 800, a player's TAKR is determined as explained above with reference to FIG. 8. At a further stage 802, the same player's time-adjusted death ranking (TADR) is determined in the same way as is explained for the TAKR with reference to FIG. 8, but substituting the formula:

$$TAKR = \frac{k}{t}$$

for the formula:

$$TADR = \frac{d}{t}$$

where the variable d represents the number of times a player's character is killed within the time window t. At a further stage 804, the player's time-adjusted kill and death ranking (TAKDR) may be determined using the formula:

$$TAKDR = (w_1 \times TAKR) + (w_2 \times TADR)$$

where $w_1$ and $w_2$ are weighting factors assigned to the TAKR and TADR of all the players in the game and $w_1 + w_2 = 1$.

The TAKR, TKDR and TAKDR systems explained above may also be used in combination with limited numbers of past kills and deaths between opponents and also by limiting data to a fixed number of most recent hours of play.

Figure 10A:
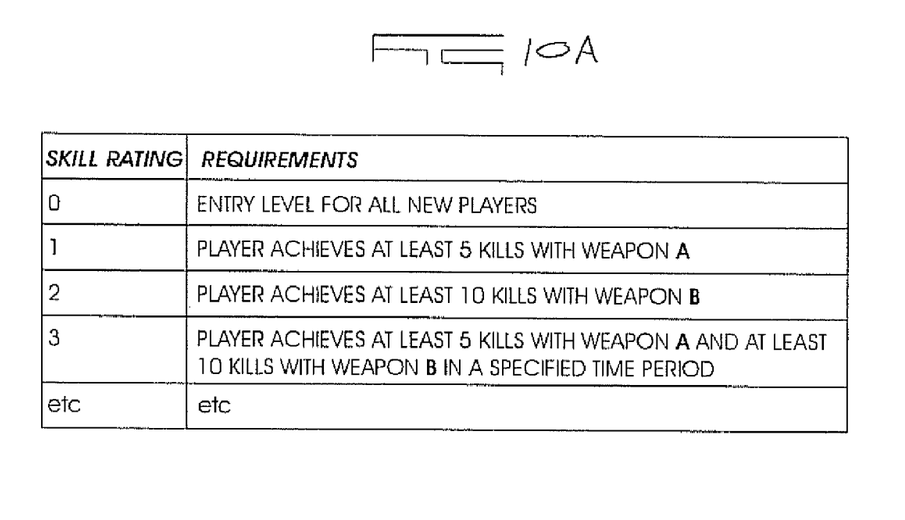
FIGS. 10A and 10B are tabular examples of rating systems used to determine handicaps.
Figure 10B:
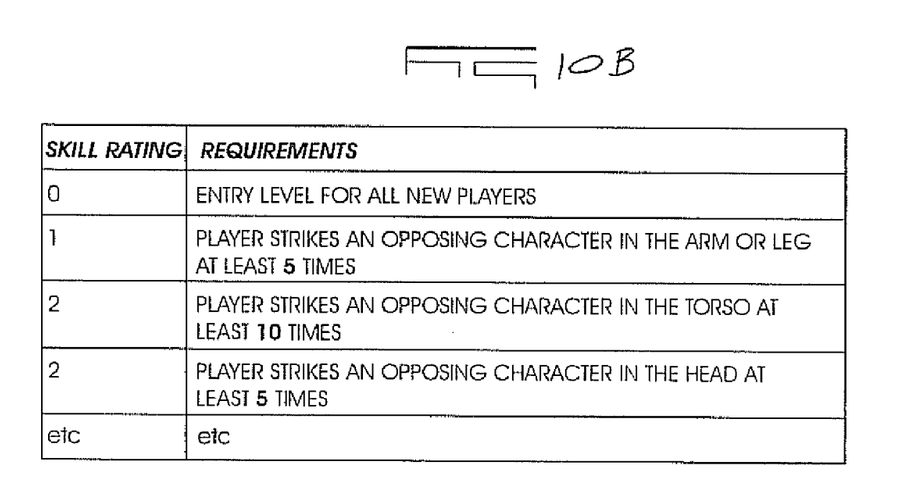

In FPS games, there are usually numerous ways of killing opponents, each of these usually requiring varying levels of skill to achieve consistently. In particular, but not exclusively, killing the characters of opponents with certain weapons may be harder than with others. Also, hitting certain parts of an opposition character's anatomy may generally be considered to require more skill. Accordingly, a ranking system may be formulated that allows a player to achieve skill ratings by achieving specific objectives. The skill rating so achieved may, in turn, serve as a player's handicap. FIGS. 10A and 10B show tables setting out example rating systems according to these principles. It should be appreciated that numerous of these game objective based rating systems may be used in combination. For example, a rating system based on achieving kills with specific types of weapons as shown in FIG. 10A, may be used in combination with a rating system based on where on the character's anatomy it was hit, as shown in FIG. 10B.

In addition to the handicapping methods and systems described above, other handicapping methods are available. For example, the ELO system mentioned above, as well as the Glicko and Glicko-2 variants. Other game environments have their own ranking systems, such as Microsoft's XBOX LIVE, which utilizes a ranking system known as TrueSkill. Any of these, for example, may be used to determine player handicaps in some embodiments and which may be used in conjunction with a differential rewards system.

Figure 7:
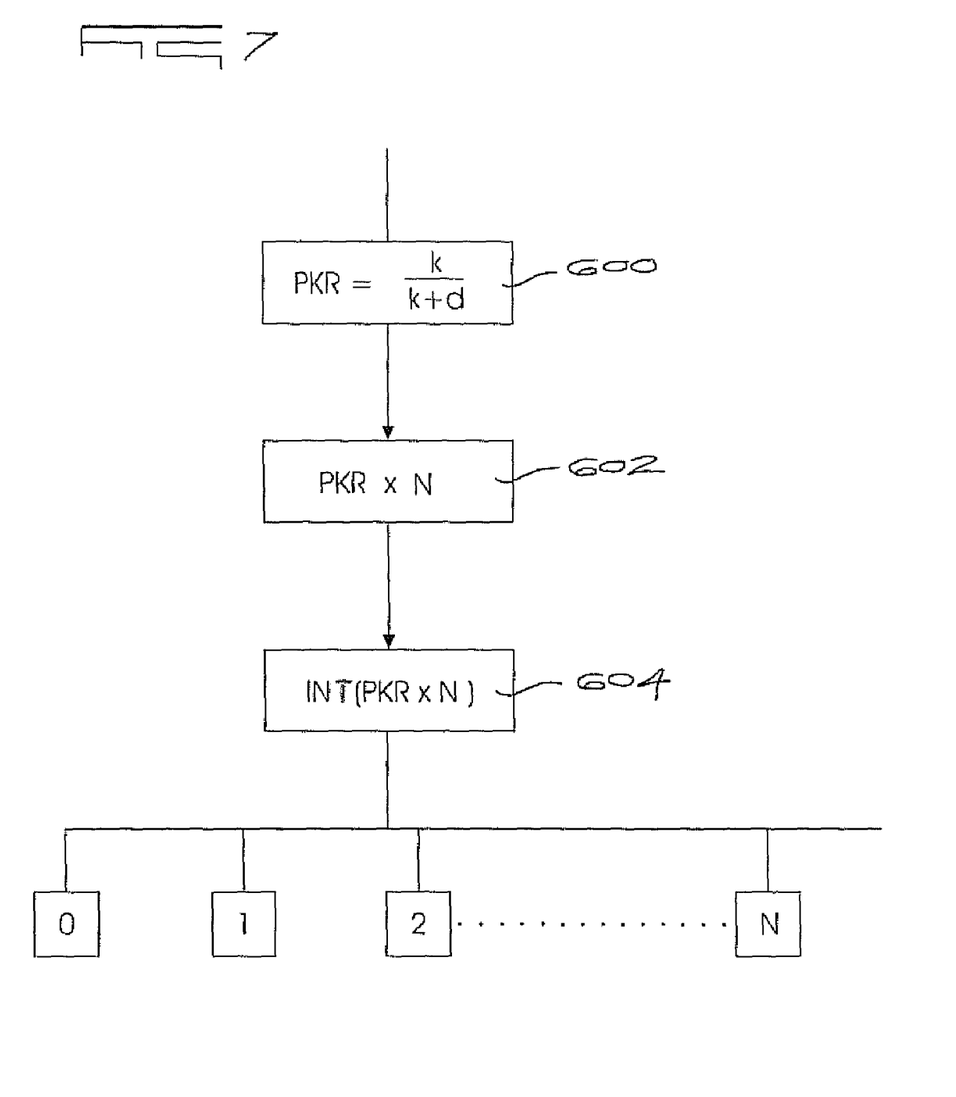
FIG. 7 is a flow diagram of alternative logic used to determine a player's handicap in a network gaming system.

Relative ranking ratios (RRRs) may be used when player kill ratios (PKRs), as explained above, are replaced by any other handicapping or ranking systems, for example, the alternatives explained with reference to FIGS. 7 to 9. A RRR may be used in combination with the formula used to determine differential rewards as explained with reference to FIG. 4, and in those circumstances will replace the relative kill ratio (RKR). For example, when player rankings are determined in accordance with the Time-Adjusted Kill and Death Ranking system, player A, who is the player with the higher ranking, may be expected to kill player B three out of every four times the players meet. In the circumstances the RRR between the players is 3 and when substituted in the equation used with reference to FIG. 4, the reward obtained by player A for killing player B will be three times less than the reward that will be obtained by player B for killing player A.

Handicapping systems that assume an underlying statistical distribution for players' skill levels (such as ELO and Glicko and their variants) may lend themselves to the calculation of differential rewards. The underlying distribution may be used to calculate the probability of any given player beating (for example, by killing) another, and vice versa.

Given this information, it may be possible to determine the quantum of the differential rewards payable to players of differing skill levels that will result in equivalent financial expectations for each of them, according to the following formula:

$$R = \frac{E}{(2 \times p)}$$

In the formula, R represents the reward payable to the player making the kill, E again represents the Equal handicap base value and p represents the probability of the player making the kill, killing the other player.

To illustrate the above principle, suppose that the underlying statistical distribution predicts that player A is likely to kill player B 60% of the time, then the reward payable to player A for killing player B in a game where E=1 would be $0.83 and the reward payable to player B for killing player A would be $1.25.

Other methods for determining differential rewards may be possible that may, at least broadly, result in financial equality between players of different skill levels, by making use of some form of statistical analysis.

From the above, it is clear that implementations may combine any number of different handicapping and differential reward systems.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples of computer-readable medium include the following (a non-exhaustive list): an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

The invention claimed is:

1. A method of enabling players of a multi-player electronic skill-based game played by two or more players having different skill levels to compete on a fair reward basis, comprising:
    (a) assigning, by a computing device, a skill-based handicap to each player participating in the game;
    (b) detecting, by the computing device, when a first player achieves a rewardable result against a second player of the two or more players, wherein the achievement of the rewardable result produces a corresponding penalisable result on the second player; and
    (c) after detecting the first player achieving the rewardable result, determining, by the computing device, a quantum of a reward associated with the rewardable result, to be credited to an account associated with the first player, as a function of at least the skill-based handicap associated with the first player and the skill-based handicap associated with the second player, and determining a quantum of a penalty associated with the penalisable result on the second player, to be debited from an account associated with the second player, as a function of at least the skill-based handicap associated with the second player and the skill-based handicap associated with the first player participating in the game, such that the quantum of the reward corresponds to the quantum of the penalty.

2. A method as claimed in claim 1, wherein the quantum of the reward and the quantum of the penalty are determined as a function of the skill-based handicaps associated with the first and second players only.

3. A method as claimed in claim 1, wherein the quantum of the reward and the quantum of the penalty are determined as a function of the skill-based handicaps associated with the first and second players and the skill-based handicap associated with at least one other player.

4. A method as claimed in claim 1, further comprising:
    storing player information and making the information available for use in subsequent games.

5. A method as claimed in claim 4, wherein:
    storing player information further comprises storing a player's skill-based handicap for use in subsequent games.

6. A method as claimed in claim 5, further comprising:
    updating the skill-based handicap associated with the first player during the game.

7. A method as claimed in claim 1, wherein the game comprises a first person shooter (FPS) game and the rewardable result includes injuring or killing a character of the second player in the game.

8. A method as claimed in claim 1, wherein the reward and penalty comprise any one of the group consisting of money, credit to an account balance, points scored, vouchers for entry into subsequent games and vouchers for entry into game tournaments.

9. The method of claim 1, wherein the function of at least the skill-based handicap associated with the first player and the skill-based handicap associated with the second player includes a determination of a ratio between the skill-based handicap associated with the first player and the skill-based handicap associated with the second player.

10. The method of claim 9, wherein the skill-based handicap associated with the first player corresponds to a ranking of the first player and the skill-based handicap associated with the second player corresponds to a ranking of the second player.

11. The method of claim 1, wherein the skill-based handicap associated with the first player is determined based on a number of rewardable results achieved by the first player over a specified period of time.

12. The method of claim 1, wherein the quantum of the reward is determined based on a function of at least the skill-based handicap associated with the first player, the skill-based handicap associated with the second player and a predefined base reward.

13. The method of claim 1, wherein the skill-based handicap associated with the first player corresponds to a player kill ratio (PKR) determined based on the following formula:

$$PKR = \frac{k}{k+d},$$

wherein k represents a number of rewardable results achieved by the first player and d represents a number of penalisable results experienced by the first player.

14. An electronic game system for a multi-player electronic skill-based game played by two or more players that enables players of different skill levels to compete on a fair reward basis, comprising:
(a) a game server that simulates a game environment;
(b) an input device associated with each player and connectable to the game server, that enables the player to control a simulated player in the simulated game environment;
(c) a display associated with each input device for displaying the actions of the simulated player in the simulated game environment;
(d) a processor; and
(e) a memory coupled to the processor that stores machine instructions causing the processor to calculate a quantum of a reward to be credited to an account associated with a first player when the first player achieves a rewardable result against a second player of the two or more players, the achievement of the rewardable result producing a corresponding penalisable result on the second player, and a quantum of a penalty associated with the penalisable result to be debited from an account associated with the second player, wherein the quantum of the reward and the quantum of the penalty are calculated as a function of a skill-based handicap associated with the first player and a skill-based handicap associated with the second player participating in the game such that the quantum of the reward corresponds to the quantum of the penalty.

15. An electronic game system as claimed in claim 14, further comprising:
(f) at least one other game server, the various game servers being inter-connectable via a computer network.

16. An electronic game system as claimed in claim 15, wherein each input device is connectable to one or more game servers via a network.

17. An electronic game system as claimed in claim 14, wherein the processor calculates the quantum of the reward and penalty as a function of the skill-based handicaps associated with the first and second players only.

18. An electronic game system as claimed in claim 14, wherein the processor calculates the quantum of the reward and penalty as a function of the skill-based handicaps associated with the first and second players and a skill-based handicap associated with at least one other player.

19. An electronic game system as claimed in claim 14, further comprising:
(f) means for storing player information that is updatable while the first and second players are participating in the game or thereafter, such information being available for use in subsequent games.

20. An electronic game system as claimed in claim 19, wherein the information includes a skill-based handicap associated with the first and second players.

21. An electronic game system as claimed in claim 14, wherein the game comprises a first person shooter (FPS) game.

22. An electronic game system as claimed in claim 14, wherein the reward and penalty comprise any one of the group consisting of money, credit to an account balance, points scored, vouchers for entry into subsequent games and vouchers for entry into game tournaments.

23. A multi-player electronic skill-based game with differential rewards, comprising:
(a) a virtual electronic game environment hosted by a game server to which two or more players may connect in order to interact with one another in the game environment;
(b) a handicap calculator which assigns a skill-based handicap to each player and periodically updates the skill-based handicap; and
(c) a differential reward calculator which calculates a quantum of a reward to be credited to an account associated with a first player for achieving a rewardable result against a second player of the two or more players, the first player's achievement of the rewardable result producing a corresponding penalisable result on the second player, and which also calculates a quantum of a penalty associated with the penalisable result which corresponds to the quantum of the reward, to be debited from an account associated with the second player and wherein the differential reward calculator calculates the quantum of the reward and the quantum of the penalty as a function of at least the skill-based handicap associated with the first player to be rewarded and the skill-based handicap associated with the second player to be penalized.

* * * * *